June 6, 1972 D. H. ROSS 3,667,882
INDUSTRIAL TIRE MOLD
Filed Jan. 19, 1971 2 Sheets-Sheet 1

INVENTOR.
Donald H. Ross
BY
Paul & Paul
ATTORNEYS.

June 6, 1972   D. H. ROSS   3,667,882
INDUSTRIAL TIRE MOLD
Filed Jan. 19, 1971   2 Sheets-Sheet 2
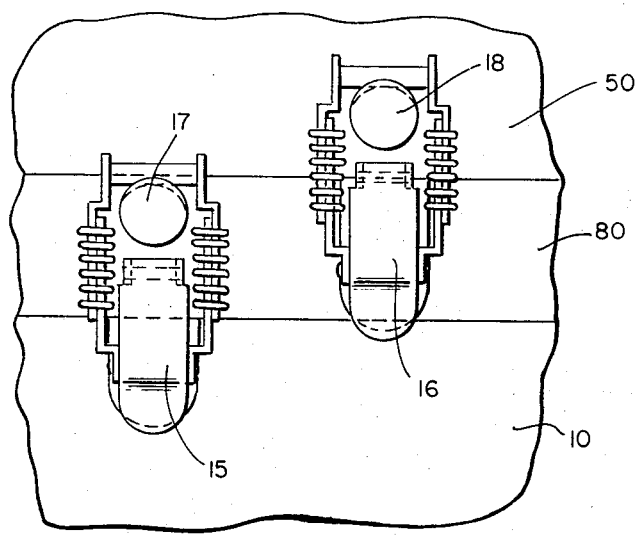
Fig. 5
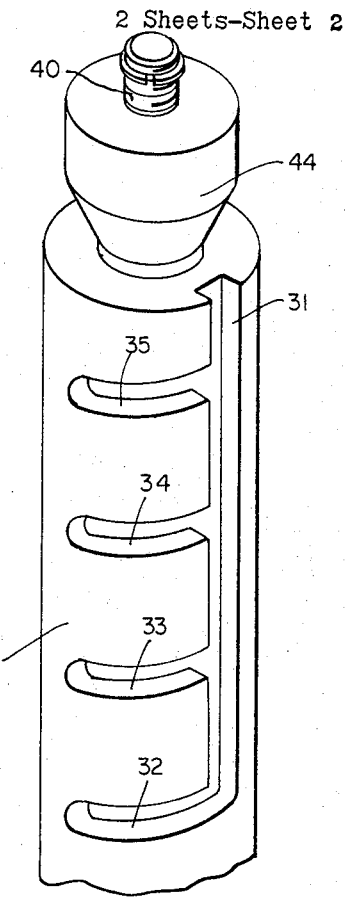
Fig. 3   Fig. 4
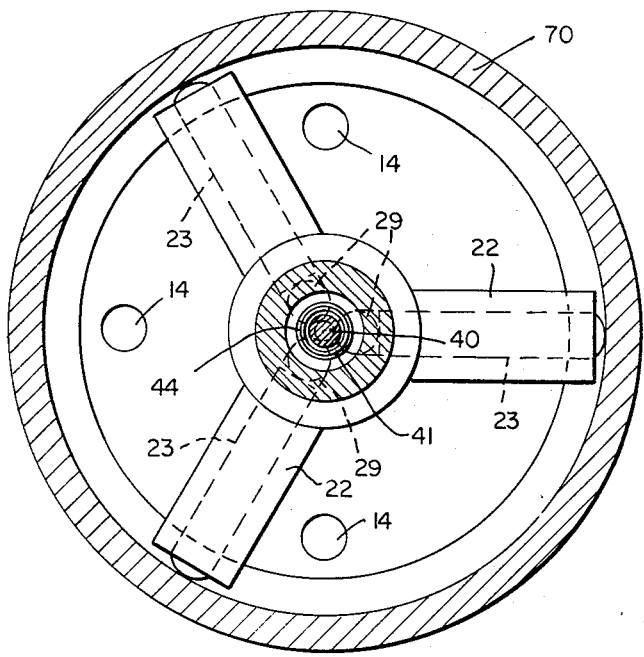
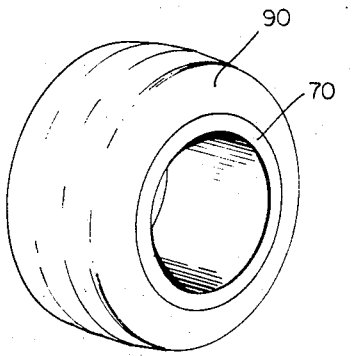
Fig. 6
INVENTOR.
Donald H. Ross
BY
Paul + Paul
ATTORNEYS.

United States Patent Office 3,667,882
Patented June 6, 1972

---

3,667,882
INDUSTRIAL TIRE MOLD
Donald H. Ross, Chalfont, Pa., assignor to Super Tire Engineering Company, Camden, N.J.
Filed Jan. 19, 1971, Ser. No. 107,746
Int. Cl. B29c *5/00;* B29d *27/00;* B29h *11/00*
U.S. Cl. 425—117                                        6 Claims

---

ABSTRACT OF THE DISCLOSURE

A mold for industrial tires and wheels of polyurethane and the like has a lower portion, an open-top upper portion, a cover for the upper portion, and provision for spacers between the lower and upper mold portions for adjusting the height of the mold to accommodate tires or wheels of different axial dimensions. The mold receives an annular hub to the surface of which a polyurethane or like solid tire is to be molded. The lower mold has a spindle having hollow radial arms with pins therein which may be cammed radially outwardly. A sleeve extends upwardly from the spindle through the lid of the upper mold portion. A stem within said sleeve has a cam at its lower end and a nut at its upper end. Turning the nut causes the stem to move downwardly and cams the radial pins outwardly to press against the inner surface of the annular hub thereby to maintain the hub centered about the axis of the mold. The mold cover has a hub portion having therein cam followers which engage cam slots in the outer surface of the sleeve so that by moving the lid rotationally the lid is cammed downwardly into closed position.

BACKGROUND OF THE INVENTION

This invention relates to molds for polyurethane or the like industrial tires and wheels. Such tires and wheels are used on industrial trucks, for example, on fork lift trucks. Whether the molded product is called a tire or a wheel depends largely upon its diameter. Small diameter molded products which are journalled directly on axles are usually called wheels, whereas larger diameter molded products which are mounted on axle hubs are usually called tires.

SUMMARY OF THE INVENTION

A principal object of the present invention is to provide a mold for molding polyurethane or like material onto an annular hub of steel or the like to form an industrial tire or wheel for industrial trucks.

A more specific object of the invention is to provide a mold of the foregoing type having means on the outside of the mold for centering within the mold annular hubs of different diameters.

Another object is to provide a mold of the foregoing type which may be adjusted to mold tires on annular hubs of different widths (axial dimension) as well as on hubs of different diameters.

BRIEF DESCRIPTION OF THE DRAWINGS

FIG. 3 is a view in section looking down along the line 3—3 of FIG. 1;

FIG. 4 is an enlarged perspective view of the sleeve showing the cam grooves in the surface thereof;

FIG. 5 is a detailed view showing a pair of spring-loaded snap locks;

FIG. 6 illustrates the finished product, i.e., a molded industrial tire or wheel.

DETAILED DESCRIPTION OF THE PREFERRED EMBODIMENT

Figure 1:
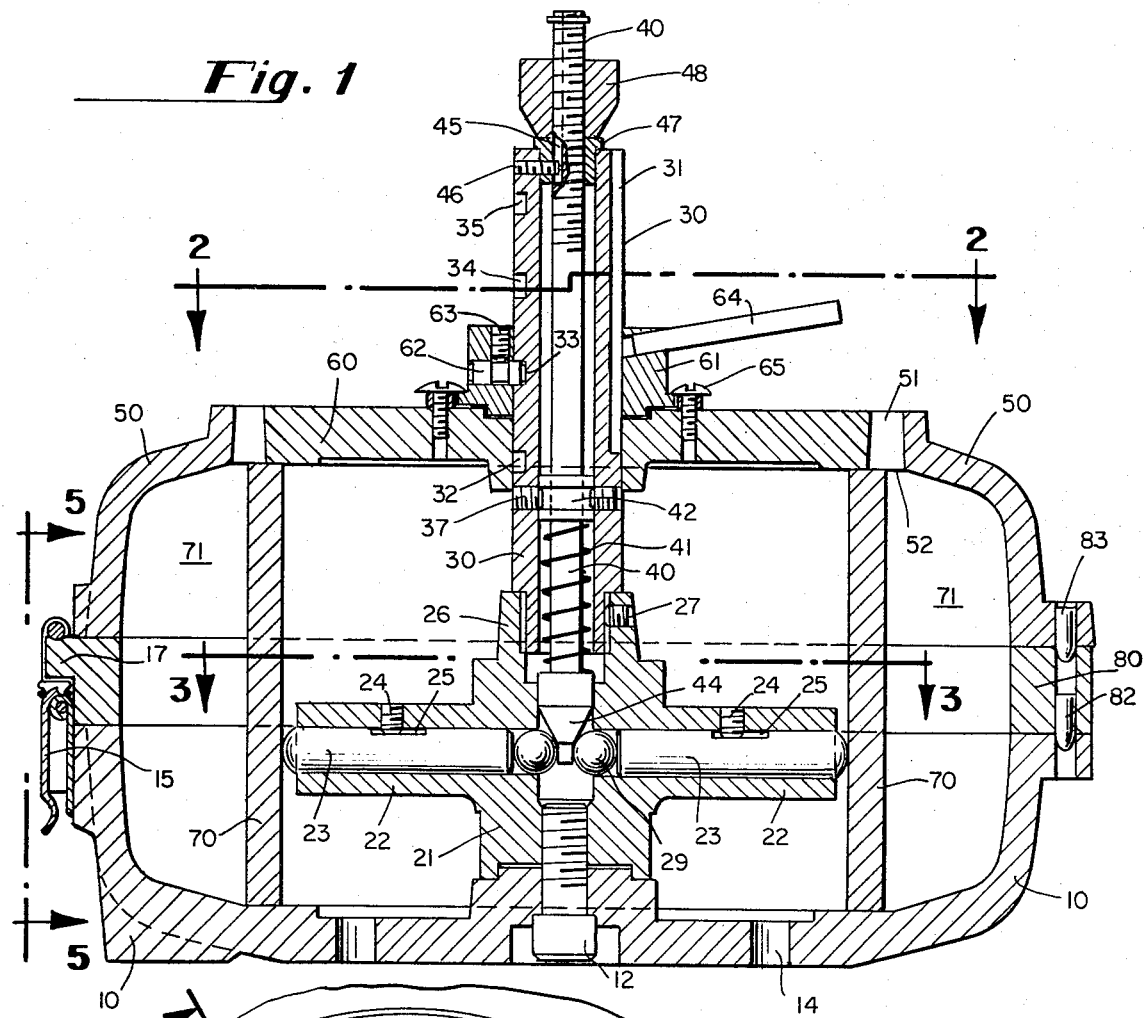
FIG. 1 is a vertical view in section along the line 1—1 of FIG. 2 showing a mold according to the present invention.
Figure 2:
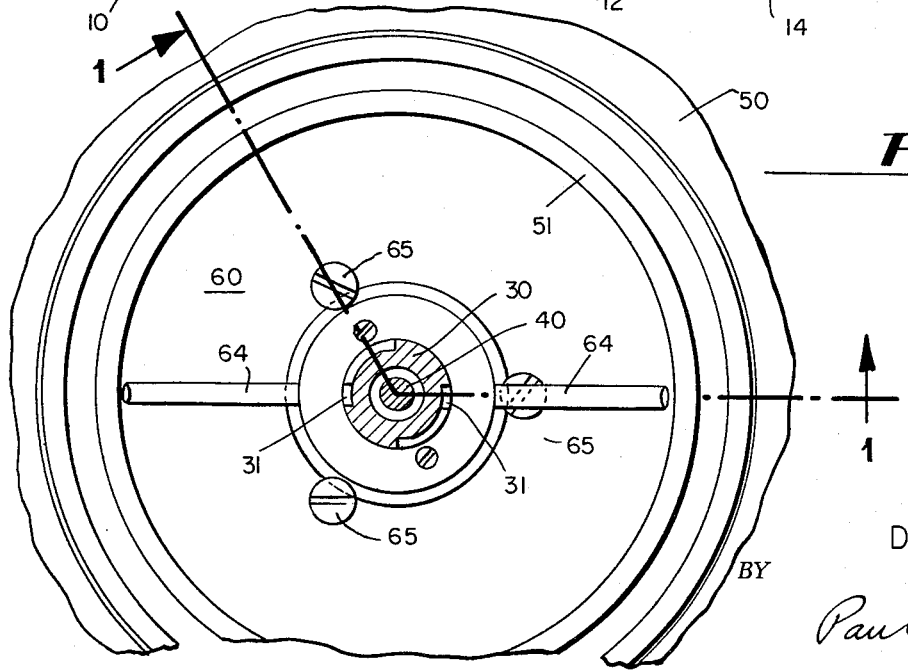
FIG. 2 is a plan view looking down along the line 2—2 of FIG. 1.

Referring now to FIG. 1, there is shown in section a mold which includes a lower member 10, an upper member 50 having an access opening in its upper surface, and a spacer 80 positioned between the upper and lower mold members. Whether or not one or more spacers 80 are used, and the width thereof (in the vertical direction of the mold) depends upon the width (axial dimension) of the annular hub 70 onto which a polyurethane tire 90 (FIG. 6) is to be molded.

The lower mold member 10 has mounted therein, on the center axis thereof, a spindle 20 whose function is to center, and to maintain centered, the annular hub 70 relative to the center axis of the mold. The centering spindle 20 is shown in FIG. 1 to be secured to the lower mold member 10 as by a bolt 12. The spindle 20 has three hollow radial arms 22 at 120° spacing, as seen best in FIG. 3. Within each of the arms is an elongated pin 23. The pins 23 are provided with slots 25 which receive set screws 24 which are set to allow for movement of the pins 23 in the radial directions but prevent the pins 23 from falling out of the arms 22. At the inward ends of the pins 23 are ball cams 29 which are engaged by a frusto-conical cam element 44.

Cam element 44 is secured to the lower end of a stem 40 which projects upwardly inside a hollow sleeve 30. The lower end of sleeve 30 is received into the neck portion 26 of the centering spindle 20 and is secured thereto as by a set screw 27. Stem 40 extends up through the sleeve 30 and has a threaded upper end which extends beyond the upper end of the sleeve. A nut 48 is supported on a bushing 47 inserted into the upper end of the sleeve 30, and a nut 48 is threaded onto the threaded upper end of the stem 40. The upper end of stem 40 is provided with a keyway 45 which receives a key 46 which is held in sleeve 30. This prevents stem 40 from rotating while allowing for movement therof in its lengthwise direction.

At the lower end of stem 40 a compression spring 41 is provided for the purpose of maintaining a downward force on stem 40 to the extent permitted by the nut 48. A spring-retaining collar 42 holds spring 41 compressed between the collar 42 and an upper shoulder of the cam element 44. The collar 42 is supported in fixed position relative to sleeve 30 by a pair of set screws 37. The stem 40 moves freely through the collar 42. It will be seen then that spring 41 constantly biases stem 40 downwardly. This prevents nut 48 from moving upwardly, away from its seat on bushing 47, when nut 48 is turned in a direction to move stem 40 downwardly. Turning the nut 48 in a loosening direction allows the downwardly spring-biased non-rotatable stem 40 to move downwardly, thereby moving the cam element 44 downwardly to spread the ball cams 29 thereby to move the pins 23 radially outwardly until the rounded outer ends of the pins 23 abut against the inside urface of the annular hub 70, thereby to center the hub 70 and to maintain it centered relative to the axis of the mold.

The upper portion 50 of the mold has a cover 60 which is put in place after the annular hub 70 has been centered in the mold by the spindle and the nut 48 loosened to hold the hub 70 in centered position. The outside diameter of the cover 60 is less than the diameter of the circular opening in the upper mold member 50, leaving an annular opening 51 which serves as a pour gate. The outside diameter of the annular hub 70 is less than the diameter of the circular opening in the upper mold member 50. The outside diameter of the cover 60 is greater than the inside diameter of the annular hub 70. Thus, the cover 60 is adapted to rest on hub 70 leaving an annular space 52 through which the polyurethane may be poured into the cavity 71.

Cover 60 includes a hub portion 61 having a pair of handles 64 and a pair of opposed followers 62 held by set screws 63. The hub 61 is rotatable on the cover 60, being held down by spaced screws 65. When the cover 60 is to be put on, the hub portion 61 is oriented relative to the upwardly projecting sleeve 30 so that the inward ends of the pair of opposed followers 62 are received into a pair of opposed vertical slots 31 in the surface of sleeve 30. The hub 61 and cover 60 are then lowered until the cam follows 62 enter one of the slightly inclined but otherwise horizontal cam grooves 32-35 in sleeve 30. Four pairs of cam grooves 32-35 are shown provided on opposite sides of the circumferential surface of the sleeve 30, as seen best in FIG. 4. The cam grooves 32-35 are spaced apart vertically by distances which correspond to the differences in the widths of the spacers 80 which are adapted to be placed between the lower and upper mold portions 10 and 50, which in turn correspond to the different widths (axial dimensions) of hub 70 which the mold is designed to accommodate.

For example, the mold may be built to receive single spacers 80 of one inch, two inch and three inch widths, or, alternatively, one, two, or three one-inch spacers, thereby allowing the mold to accommodate hubs 70 of four different widths (axial dimension). In such case, the sleeve 30 would have an appropriate length to allow it to extend above the mold by a distance sufficient for four cam grooves 32-35 each spaced one-inch apart. In FIG. 1, spacer 80 is assumed to be a one-inch spacer, and, accordingly, cam followers 62 are illustrated as being received in the second of the pair of cam grooves, i.e., cam grooves 33.

In operation, if the tire of wheel to be molded is of minimum width (axial dimension), no spacer is used, and the upper mold portion 50 is placed directly on the lower portion 10 and latched thereon, as by a spring-loaded draw-and-snap lock. If the tire or wheel to be molded is one inch wider than minimum, a one-inch spacer 80 is used. In this case, the spacer 80 is latched to the lower mold member 10, as by the draw-and-snap lock 15 shown in FIG. 5, and the upper mold member 50 is placed on and latched to spacer 80, as by a second draw-and-snap lock 16 which is displaced circumferentially from the first snap lock 15. Locator pins 82 locate the spacer 80 angularly relative to the lower mold member 10, and locator pins 83 locate the upper mold member 50 angularly relative to the spacer 80 so that the draw-and-snap locks 15 and 16 are properly aligned with the projections 17 and 18. If more than one spacer 80 is used, a similar arrangement is used with respect to the draw-and-snap locks. For example, if three draw-and-snap locks are used to latch two spacers 80 between the lower and upper mold members, the three draw-and-snap locks are displaced circumferentially from each other.

The annular steel hub 70 may be inserted into the mold at any time before the cover 60 is put in place. After cover 60 has been put in place, the hub portion 61 is turned rotationally by means of the handles 64, and the pair of cam followers 62 ride in one of the pairs of cam grooves 32-35. Since these grooves are inclined slightly downwardly, the cover 60 seats on, and is pressed tightly against, the upper edge of the annular hub 70.

The polyurethane material is poured in liquid form into the pour gate, formed by the annular openings 51 and 52, to fill the annular mold cavity 71. The lower mold member 10 may be provided with drain ports 14 to drain off any polyurethane liquid which unintentionally falls into the center of the mold.

To remove the molded tire or wheel from the mold, the handles 64 are turned to release the hub 61 and cover 60. The cover 60 is then removed, after which the upper mold section 50 is removed. The nut 48 is then tightened to pull the lower end of the stem 40 upwardly, compressing spring 41 and relieving the pressure of the pins 23 against the inner surface of the annular hub 70. The molded tire or wheel may then be removed from the mold.

What is claimed is:

1. A mold for polyurethane or like industrial tire or wheel, said mold comprising:
   (a) a lower mold member and an upper mold member;
   (b) said upper mold member having an access opening in the upper surface thereof to allow for entry of an annular hub to the outer surface of which a polyurethane or like tire is to be molded;
   (c) a centering spindle having a base portion, a neck portion, and radially projecting hollow arms, and means securing said base portion of said spindle to said lower mold member on the center axis thereof;
   (d) an elongated hollow sleeve member secured to the neck portion of said spindle and projecting upwardly through said access opening in said upper mold member;
   (e) a stem extending through said sleeve member and projecting beyond each end thereof;
   (f) a cam element at the lower end of said stem, said cam element being received within the neck portion of said spindle;
   (g) elongated pins in said hollow radial arms of said spindle adapted, in response to axial movement of said stem, to be extended outwardly beyond the end of said radial arms to engage and to center said annular hub in said mold;
   (h) a cover for said access opening of said upper mold member, said cover having a hub portion having an opening therethrough adapted to receive said stem and sleeve;
   (i) cam grooves in said stem and cam groove follower means in said hub portion of said cover adapted to cooperate to close and lock said cover, said cover having a diameter smaller than the diameter of said access opening, to provide an annular opening through which polyurethane or like material may be poured into said mold.

2. A mold according to claim 1 characterized in that the diameter of said cover is larger than the inner diameter of the annular hub the outer surface of which is to be provided with molded material, so that when said cover is closed said cover seats on the upper edge of said annular hub.

3. A mold according to claim 2 characterized in that spring means and spring retaining means are provided to bias said stem downwardly, to bias said centering pins radially outwardly.

4. A mold according to claim 3 characterized in that one or more spacer bands are provided adapted to be placed between said upper and lower mold members to increase the height of said mold, and in that means are provided for latching said spacer bands to said lower and upper mold members.

5. A mold according to claim 4 characterized in that said cam grooves in said stem are inclined slightly from the horizontal, and are spaced apart vertically by distances which correspond to the differences in the widths (axial dimension) of the annular hubs which the mold is designed to accommodate.

6. A mold according to claim 5 characterized in that a nut is provided at the upper end of said stem to function as an adjustable stop to limit the extent to which said spring biasing means may move said stem downwardly.

References Cited

UNITED STATES PATENTS

| | | | |
|---|---|---|---|
| 2,098,688 | 11/1937 | Lanyon | 18—42 T |
| 2,860,379 | 11/1958 | Beckadolph et al. | 18—42 T UX |
| 2,873,790 | 2/1959 | Cadwell et al. | 18—42 T UX |
| 3,123,122 | 3/1964 | Beckadolph | 18—42 T UX |
| 3,383,440 | 5/1968 | Chaldekas | 18—5 P X |
| 3,457,594 | 7/1969 | Baudou | 18—5 P X |
| 3,459,849 | 8/1969 | DeRonde | 18—42 T X |
| 3,555,141 | 1/1971 | Beneze | 18—42 T UX |

FOREIGN PATENTS

| | | | |
|---|---|---|---|
| 965,269 | 7/1969 | Great Britain | 18—42 T |

J. HOWARD FLINT, JR., Primary Examiner

U.S. Cl. X.R.

425—38, 47